(12) United States Patent
Stroh

(10) Patent No.: US 6,173,878 B1
(45) Date of Patent: Jan. 16, 2001

(54) DEVICE FOR CONNECTING METALLIC MATERIALS

(75) Inventor: Dieter Stroh, Stettiner (DE)

(73) Assignee: Schunk Ultraschalltechnik GmbH, Wettenberg (DE)

( * ) Notice: Under 35 U.S.C. 154(b), the term of this patent shall be extended for 0 days.

(21) Appl. No.: 09/218,050

(22) Filed: Dec. 22, 1998

(51) Int. Cl.$^7$ .................................................. B23K 1/06
(52) U.S. Cl. .............................. 228/1.1; 228/110; 228/111
(58) Field of Search ........................... 228/1.1, 110, 111, 228/110.1, 44.3, 44.7, 102, 4.5

(56) References Cited

U.S. PATENT DOCUMENTS

| | | | |
|---|---|---|---|
| 4,646,957 | | 3/1987 | Nuss . |
| 4,867,370 | * | 9/1989 | Welter et al. .................. 228/110 |
| 4,869,419 | * | 9/1989 | Nuss .............................. 228/110 |
| 5,192,015 | * | 3/1993 | Ingle et al. ..................... 228/111 |
| 5,323,952 | * | 6/1994 | Kato et al. ..................... 228/102 |
| 5,360,155 | * | 11/1994 | Ooki et al. ..................... 228/1.1 |
| 5,771,100 | * | 6/1998 | Patrikios ........................ 228/1.1 |

* cited by examiner

Primary Examiner—Patrick Ryan
Assistant Examiner—M. Alexandra Elve
(74) Attorney, Agent, or Firm—Dennison, Scheiner, Schultz & Wakeman

(57) ABSTRACT

The invention relates to a device for connecting metallic materials, in particular electrical conductors such as flexible cables, by means of a transducer (10) which generates ultrasonic oscillations and contains a sonotrode (16) with a sonotrode head (14) as well as a converter (12). In order to be able to embody the transducer compactly, it is provided that the transducer alone is seated in the first oscillation node remote from the sonotrode head.

17 Claims, 5 Drawing Sheets

DEVICE FOR CONNECTING METALLIC MATERIALS

BACKGROUND OF THE INVENTION

The invention relates to a device for connecting metallic materials, in particular electrical conductors such as flexible cables, by means of ultrasound with a transducer which generates ultrasonic oscillations of a wavelength lambda and containing a sonotrode with a sonotrode head, as well as a converter, wherein the transducer is seated at a distance of at least lambda/4 in respect to the sonotrode head.

Conventional transducers for generating ultrasonic oscillations comprise a converter for converting electric oscillations into ultrasonic oscillations of a desired frequency and amplitude, a booster, as well as a sonotrode with a sonotrode head having an electrode, or respectively a work surface, wherein the contact with the materials to be welded takes place for welding metal elements, such as flexible cables. Since the welding surface, or respectively the welding point, extends parallel in respect to the sonotrode oscillation axis, the seating must not only absorb axial and radial forces, but also bending moments.

In this connection it is known to seat a transducer, comprising a converter, a booster and a sonotrode, in oscillation nodes extending in the booster as well as in the sonotrode. This in turn means a long structure of the transducer.

With a booster-less embodiment of a transducer, which therefore only contains a converter and a sonotrode, a partition can be formed between the converter and the sonotrode, in which a diaphragm spring is clamped, by means of which the transducer is seated. Moreover, a support in the oscillation node (FIG. 9) extending in the sonotrode is provided. In this case the diaphragm spring extends in the oscillation maximum. Not only is a radially large structure necessary because of the use of the diaphragm spring, but also an axially flexible seating. In connection with a further booster-less oscillation embodiment, seating is provided in the oscillation neutral point in the converter, as well as support in the oscillation zero point of the sonotrode (FIG. 10). It has been found here that the zero point seating in the converter leads to considerable problems.

In connection with a further known transducer, which includes a converter, booster and sonotrode, the booster and the sonotrode are respectively seated, or respectively supported, in the oscillation zero point (FIG. 7). The use of the booster results in a long structure. Moreover, transducers are known having partitions between the converter and the booster on the one hand, and the booster and the sonotrode on the other hand, from which diaphragm spring extend (FIG. 8). Since seating takes place in the oscillation maximum, the transducer is very flexibly supported. In addition, a large radial structure results because of the diaphragm spring used.

A device of the type known at the outset is known from DE 35 08 122 C2. Here, the sonotrode is supported by a plurality of locking screws, which are aligned perpendicularly in relation to the longitudinal axis of the sonotrode, which themselves do not absorb the occurring axial and radial forces, as well as bending moments, to the required degree. It is therefore necessary to additionally support the converter or booster. In actual use this takes place in the booster.

SUMMARY OF THE INVENTION

The present invention is based on the problem of further developing a device of the type mentioned at the outset in such a way that, along with a short construction, the appearing axial and radial forces, as well as the bending moments, are absorbed to the extent necessary. However, sufficient rigidity should also be provided in order to compensate static forces.

In accordance with the invention, the problem is essentially solved in that the transducer is exclusively supported at a distance of lambda/4 in respect to the sonotrode head by means of a seating for absorbing radial and axial as well as bending moments and torsion moments.

By means of the teaching of the invention there is the possibility of making available a booster-less and therefore compact transducer having a single seating which extends in the area of the sonotrode, namely in the first oscillation node from the direction of the sonotrode head.

By means of the teaching of the invention, a transducer is made available for the first time for welding metal elements together, which has a single seating, which is a possibility which up to now was only available in connection with plastic welding, namely in the oscillation zero point of a booster which, however, causes a long structure of the transducer, since the seating point is 3·lambda/4 away from the sonotrode head. Furthermore, the seating need not absorb any bending moments, since in plastic welding the oscillation axis of the sonotrode extends perpendicularly in relation to the surfaces to be welded. For this reason, transducers intended for metal welding were always seated in two areas.

In accordance with a preferred embodiment of the invention it is provided that the seating has a first section which radially projects from the sonotrode and which makes a transition into a second section, which extends in the longitudinal direction of the transducer and is spaced apart from the latter. The transducer itself is then fixed in place by means of the second section and at a distance from the first section, because of which an elastic uncoupling takes place from the occurring transverse forces, or respectively transverse stretching, which occur in the oscillation node because of stretching, or respectively compression, of the sonotrode. In particular, the first section is a circumferential ring, or respectively a circumferential disk, and the second section is a hollow cylinder, which can be designed as one piece or as separate elements, which are then connected with each other, for example screwed together.

The first section can be embodied integrally with the sonotrode. But alternatively there is also the possibility of designing the sonotrode in several pieces, and to clamp the first section into a partition extending at a distance lambda/4 from the sonotrode head, from which section the second section for elastic coupling starts, which extends along the transducer. Because of the embodiment of the sonotrode in several pieces there is the advantage, that worn elements can be exchanged without problems, without the entire sonotrode needing to be replaced. The individual sonotrode elements can be screwed together.

In accordance with an alternative solution suggestion it is provided that the sonotrode has a partition, which divides it into two axial sections and from which a radially extending disk-shaped element starts, which itself is fixed in place in areas extending diametrically in relation to the sonotrode. In this case the areas themselves are clamped between cheeks which preferably are made of plastic, so that the transverse forces, or respectively transverse stretching, occurring because of the stretching and compression of the sonotrode, can be absorbed. In particular, each area extends in an oscillation node of the disk-shaped element.

BRIEF DESCRIPTION OF THE DRAWINGS

Further details, advantages and characteristics ensue not only from the claims, the features to be taken therefrom—by themselves and/or in combination—but also from the following description of exemplary embodiments to be found in the drawings:

DESCRIPTION OF THE PREFERRED EMBODIMENT

Figure 1:
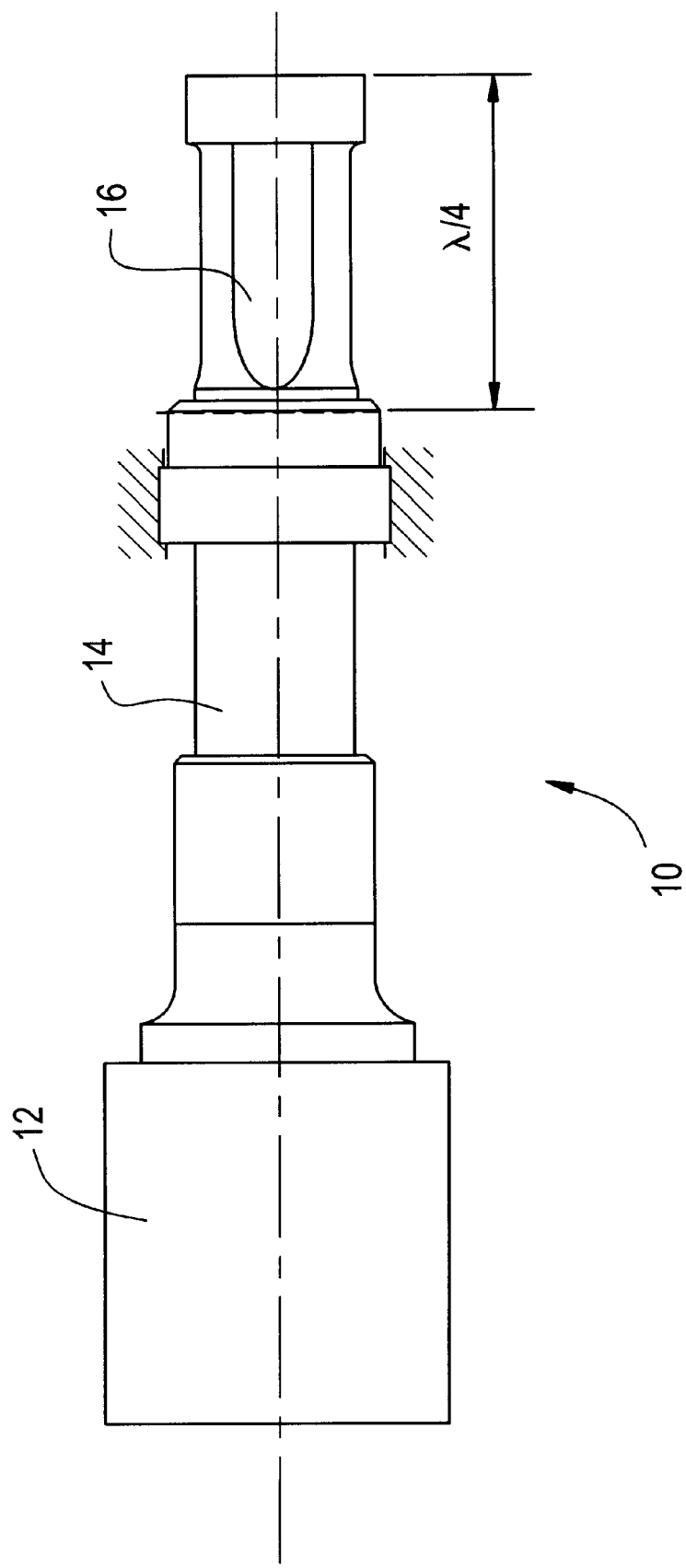
FIG. 1, a basic representation of a transducer intended for an ultrasonic welding device for connecting metallic materials, FIG. 2, a first embodiment of a sonotrode, FIG. 3, a second embodiment of a sonotrode, FIG. 4, a third embodiment of a sonotrode, FIG. 5, the sonotrode in FIG. 4 in a front view, and FIGS. 6 to 10, basic representations of transducers in accordance with the prior art, as well as a transducer in accordance with the invention.

A transducer 10, which is intended for a device for welding together metallic materials, in particular electrical conductors such as flexible cables, by means of ultrasound, is represented purely basically in FIG. 1. The transducer 10 consists of a converter 12 and a sonotrode 14, which is connected with it, preferably by means of a screw connection. Electrical oscillations are converted into ultrasonic oscillations of the desired frequency and amplitude by means of this converter 12.

However, in this respect reference is made to the applicable prior art, without further explanations being required.

The sonotrode 14 has a sonotrode head 16 with a surface, which can be called an electrode, acting on the metallic workpieces to be welded together, wherein the weld surface of the materials extends parallel in relation to the sonotrode oscillation axis.

In accordance with the invention, the transducer 10 is seated in only one area, namely in the first oscillation node, i.e. at a distance of lambda/4 from the sonotrode head 16, viewed from the direction of the sonotrode head 16. Here, the seating is designed in such a way that the occurring radial and axial forces, as well as bending moments caused by welding and possibly torsion moments, can be absorbed to the required extent.

Figure 2:
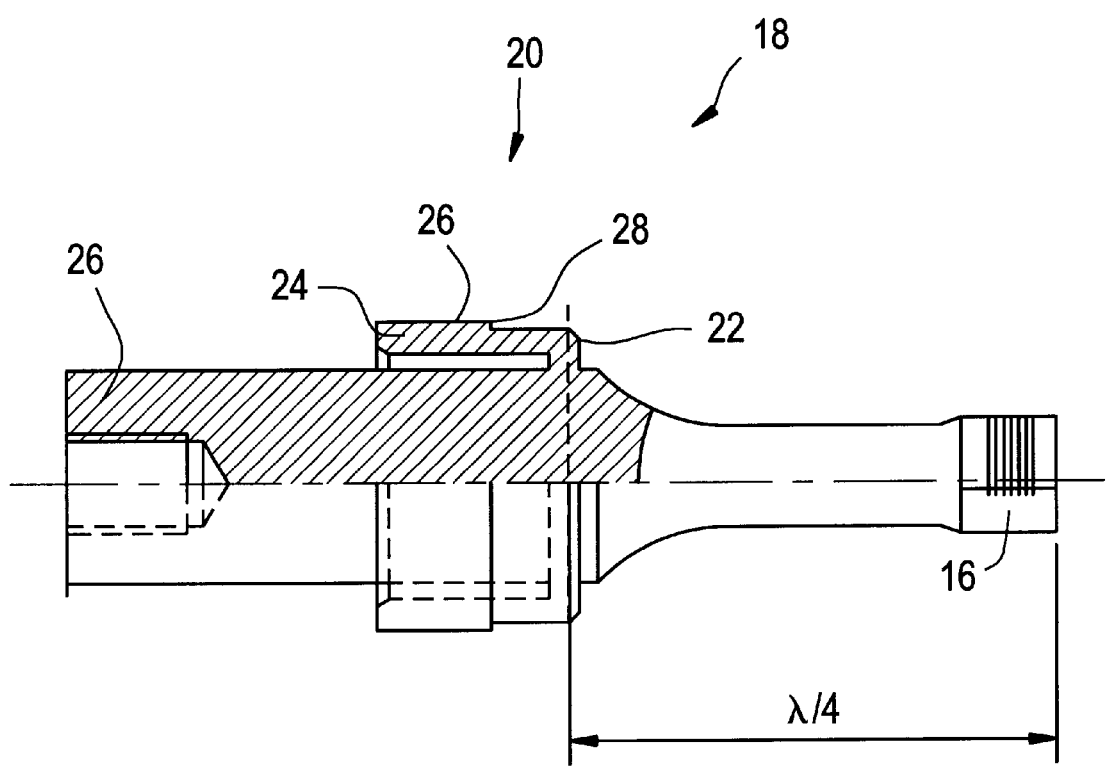

A preferred embodiment of a sonotrode 18 with seating 20 is represented in FIG. 2, which consists of a ring-shaped section 22, projecting radially from the oscillation zero point, as well as of a cylinder section 24 extending in the longitudinal direction of the sonotrode, which form a unit. Here, the cylinder section 24 extends at a distance from the exterior surface 26 of the sonotrode 18.

If in the exemplary embodiment the hollow-cylindrical section 24 extends in the direction toward the converter, it is of course possible that an extension in the direction toward the sonotrode head 16 can also take place.

Now the sonotrode 18 is seated via the holder 20 in the area of the section 24 spaced apart from the radially extending ring 22. By means of this an elastic uncoupling, or respectively buffering, of the transverse forces, or respectively stretching, occurring in the oscillation zero point because of the stretching, or respectively compression of the sonotrode, takes place. It is simultaneously possible to absorb the bending moments, or respectively torsion moments, to the required extent. In the exemplary embodiment, the support area of the sonotrode 18 has been provided with the reference numeral 26 and extends in the free end area of the hollow-cylindrical section 24, which is separated from the area on the ring side by a step 28.

Figure 3:
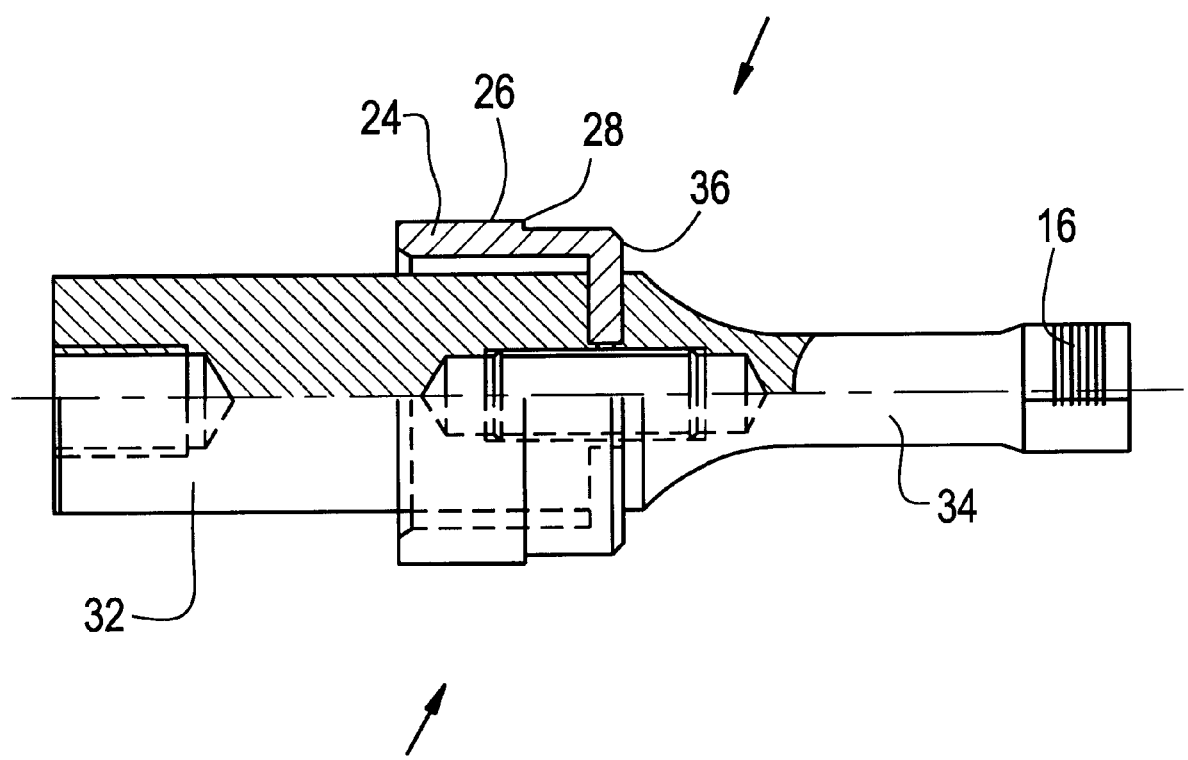

A sonotrode 30 is represented in FIG. 3 which is made of two pieces, i.e. consists of two axial sections 32, 34, the front section 34 of which has the sonotrode head 16. Thus, a partition is formed between the sections 32, 34, in which a disk 36 is clamped, whose circumference projects past the sonotrode 30 and in this way can correspond to a geometry which is equal to the radially projecting ring 22 in the embodiment of FIG. 2. A hollow-cylindrical section also starts at the disk section 36 and extends along the sonotrode 30, so that the reference numerals which can be found in FIG. 2 are used. If the radial section 22, or respectively the disk 36, are embodied integrally with the hollow-cylindrical section 24 in the exemplary embodiments in FIGS. 2 and 3, a multi-piece version can also be used, wherein the radially and axially extending elements are screwed together, for example.

Figure 4:
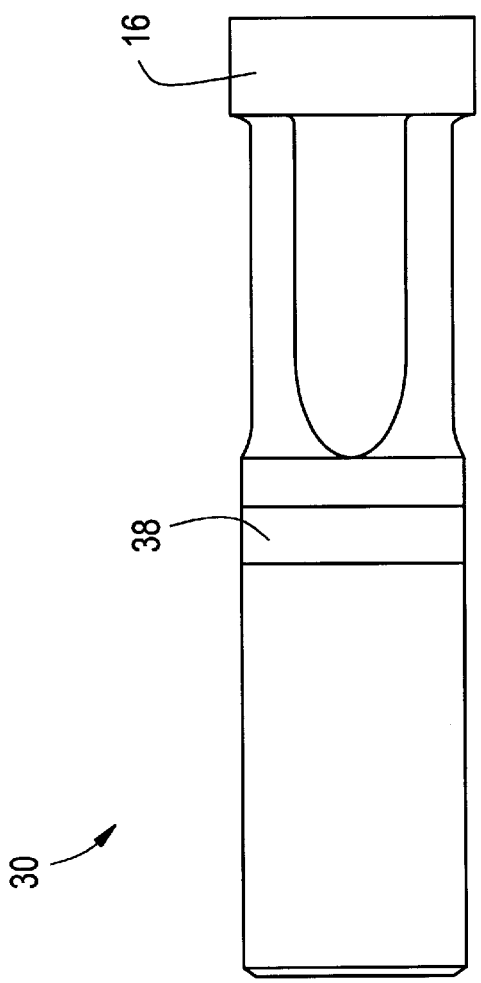
Figure 5:
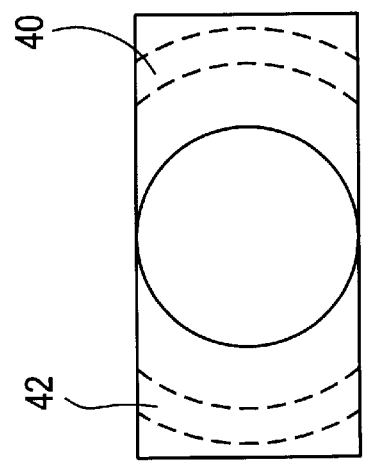

Even if the seating preferably has a hollow-cylindrical section 24 extending along the longitudinal axis of the sonotrode 14, 18, 30, on which the sonotrode 14 is clamped, in accordance with the exemplary embodiment in FIGS. 4 and 5 there is the option of seating and clamping the sonotrode 30 in the oscillation zero point by means of a disk-shaped element 38, which is preferably rectangular in a view from above, which itself is clamped in areas 40, 42 extending diametrically in respect to the sonotrode 30. In this case the disk-shaped element 38 is preferably fixed in place between cheeks made of plastic, so that the possibility of compensating occurring transverse forces to a sufficient extent exists. The areas 40, 42 should moreover extend in oscillation nodes of the disk-shaped element 38.

In the exemplary embodiment of FIGS. 4 and 5, the sonotrode 30 is also preferably made of two pieces, wherein the partition extends in the oscillation node in which the disk-shaped element 38 is connected with the sonotrode elements.

A compact structure results from the teaching in accordance with the invention, which is achieved in a particularly preferred manner by means of the exemplary embodiments of FIGS. 2 and 3; because a small construction results both in the length of the respective sonotrode 18, 30 as well as in the radial dimensions.

Typical sizes of sonotrodes of the invention, which correspond to the exemplary embodiments in FIGS. 2 and 3 are:

Output: 1000 to 3000 Watt

Frequency: 20 to 40 KHz

Wavelength: 125 to 145 mm

Length of the transducer consisting of the sonotrode and the converter: 250 to 290 mm Diameter of the sonotrode in the area of seating (exterior surface of the hollow-cylindrical section) in the area of support:

30 to 60 mm.

Figure 6:
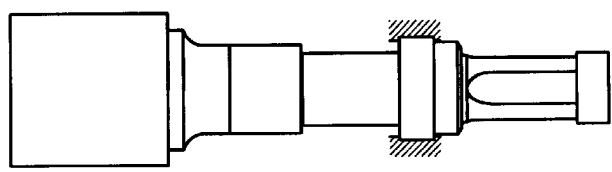
Figure 7:
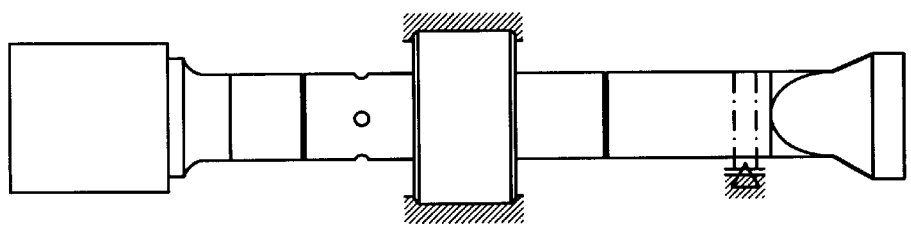
Figure 8:
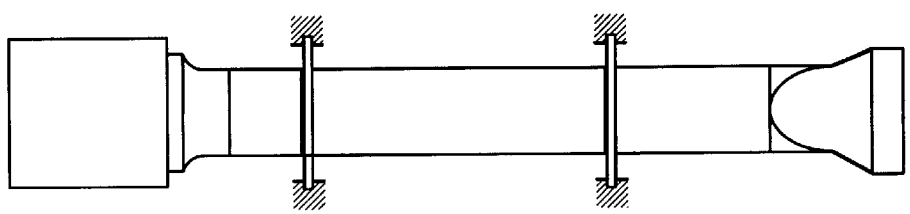
Figure 9:
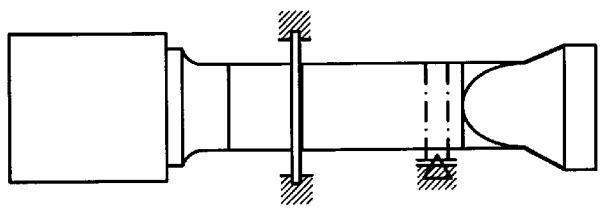
Figure 10:
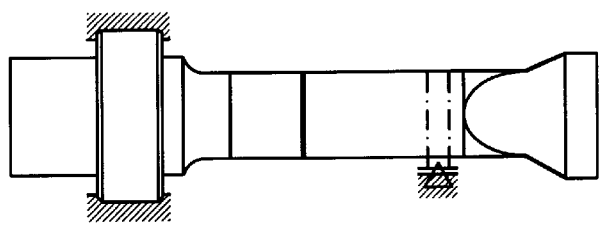

In FIGS. 6 to 10 the transducer seating known from the prior art (FIGS. 7 to 10) is again shown juxtaposed to the seating in accordance with the invention (FIG. 6).

What is claimed is:

1. A device for connecting metallic materials, in particular electrical conductors such as flexible cables, by means of ultrasound with a transducer (10) which generates ultrasonic oscillations of a wavelength lambda and containing a sonotrode (14, 18, 30) as well as a converter (12), wherein the transducer is seated at a distance of at least lambda/4 in respect to the sonotrode head (16), characterized in that the transducer (10) is exclusively supported at a distance of lambda/4 in respect to the sonotrode head (16) by means of a seating (20, 38) for absorbing radial and axial forces as well as at least bending moments and/or torsion moments.

2. The device in accordance with claim 1, characterized in that the seating has a first section (22, 36) which radially projects away from the sonotrode (18, 30) and which makes a transition into a second section (24), which extends in the longitudinal direction of the transducer and is spaced apart from the latter.

3. The device in accordance with claim 2, characterized in that the transducer (10, 18, 30) is fixed in place by means of the second section (24) at a distance from the first section (22, 36).

4. The device in accordance with claim 2, characterized in that the first section (22) is a circumferential ring (32).

5. The device in accordance with claim 2, characterized in that the first section (22) is a disk (36), which radially projects over the sonotrode (30).

6. The device in accordance with claim 2, characterized in that the second section (22) is a hollow cylinder.

7. The device in accordance with claim 2, characterized in that that the first and second sections (22, 36, 24) are embodied to be one piece.

8. The device in accordance with claim 2, characterized in that the first section (22) is embodied integrally with the sonotrode (18).

9. The device in accordance with claim 2, characterized in that the second section (24) is releasably connected with the first section (22, 36), such as by screwing.

10. The device in accordance with claim 2, characterized in that the sonotrode (30) is formed of at least two axial sections (32, 34) with a partition extending at a distance of lambda/4 in respect to the sonotrode head (16), from which the first section (36), which projects away radially on the circumference past the sonotrode, extends.

11. The device in accordance with claim 10, characterized in that the first section (36) is clamped between the axial sections (32, 34) of the sonotrode (30).

12. The device in accordance with claim 10, characterized in that the axial sections (32, 34) of the sonotrode (30) are screwed together.

13. The device in accordance with claim 1, characterized in that the sonotrode (30) has a partition, which divides it into two axial sections (32, 34) at a distance of lambda/4 in relation to the sonotrode head (16), from which a radially extending disk- shaped element (38) starts, which itself is fixed in place, such as clamped, in areas (40, 42) extending diametrically in relation to the sonotrode.

14. The device in accordance with claim 13, characterized in that each area is clamped between cheeks which preferably are made of plastic.

15. The device in accordance with claim 13, characterized in that the area (40, 42) lies in an oscillation node of the disk-shaped element (38).

16. The device in accordance with claim 6, characterized in that the hollow-cylindrical, preferably parallel to the longitudinal, or respectively oscillation axis of the sonotrode extending hollow-cylindrical section extends, starting at the first section (32, 36), in the direction toward the converter.

17. The device in accordance with claim 6, characterized in that the hollow-cylindrical, preferably parallel ti the longitudinal, or respectively oscillation axis of the sonotrode extending hollow-cylindrical section extends, starting at the first section (32, 36), in the direction toward the sonotrode head (16).

* * * * *